Sept. 11, 1956

J. V. COOK 2,762,321

BAKING OVEN

Filed Oct. 14, 1952

INVENTOR.
John V. Cook
BY
Otto Moeller
Attorney

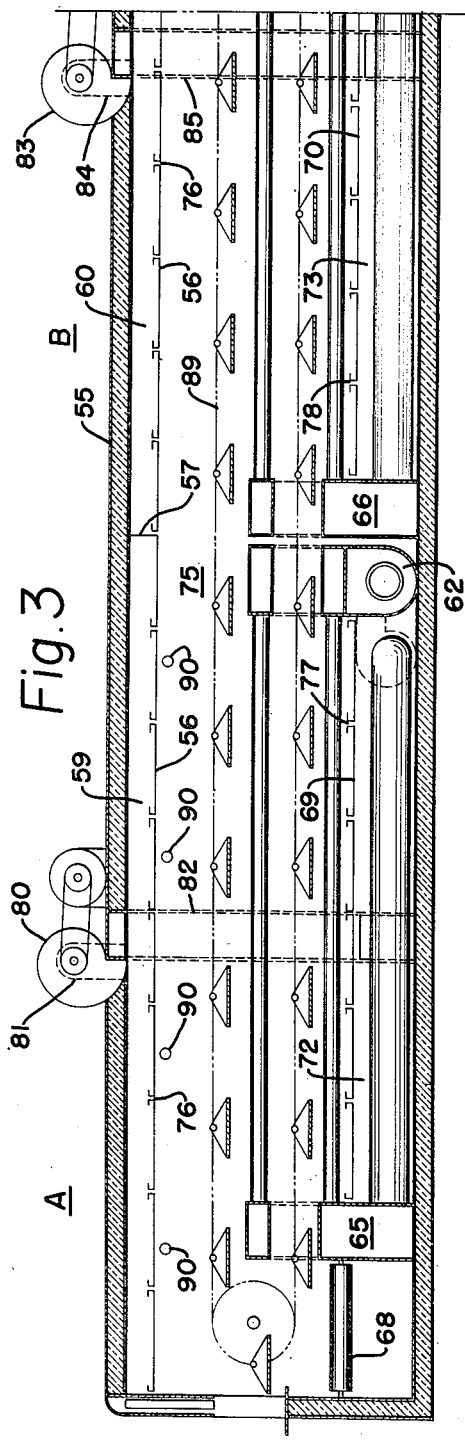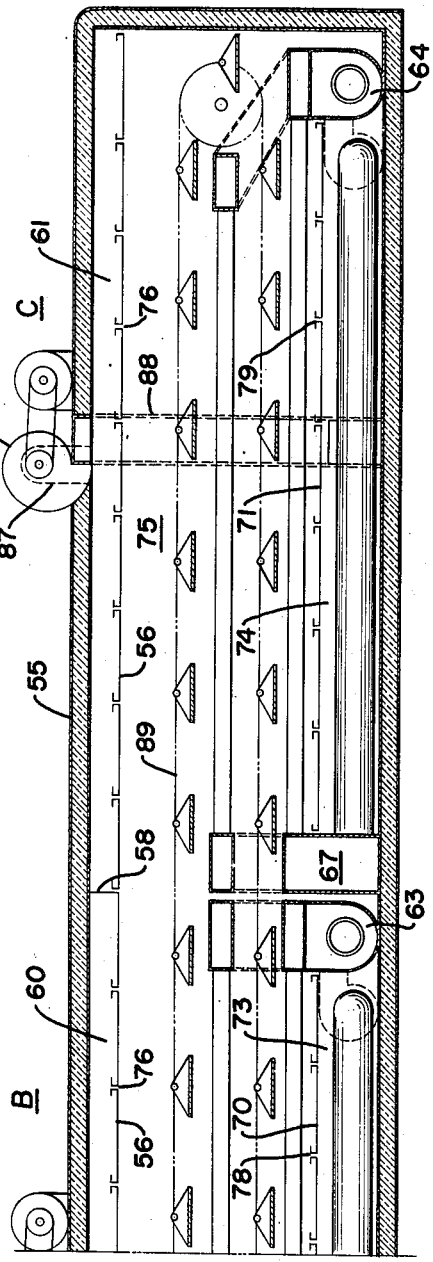

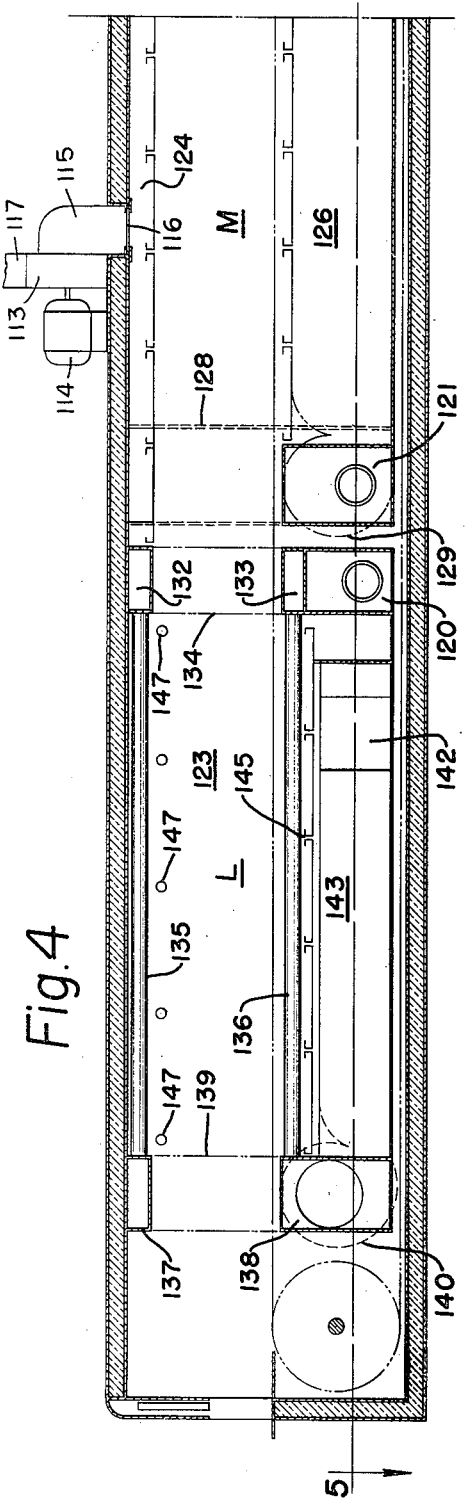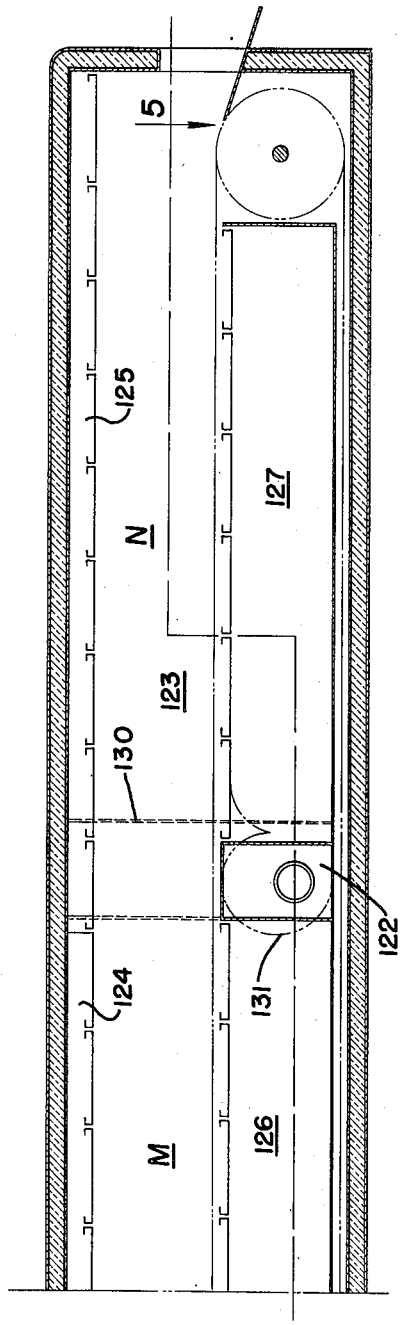

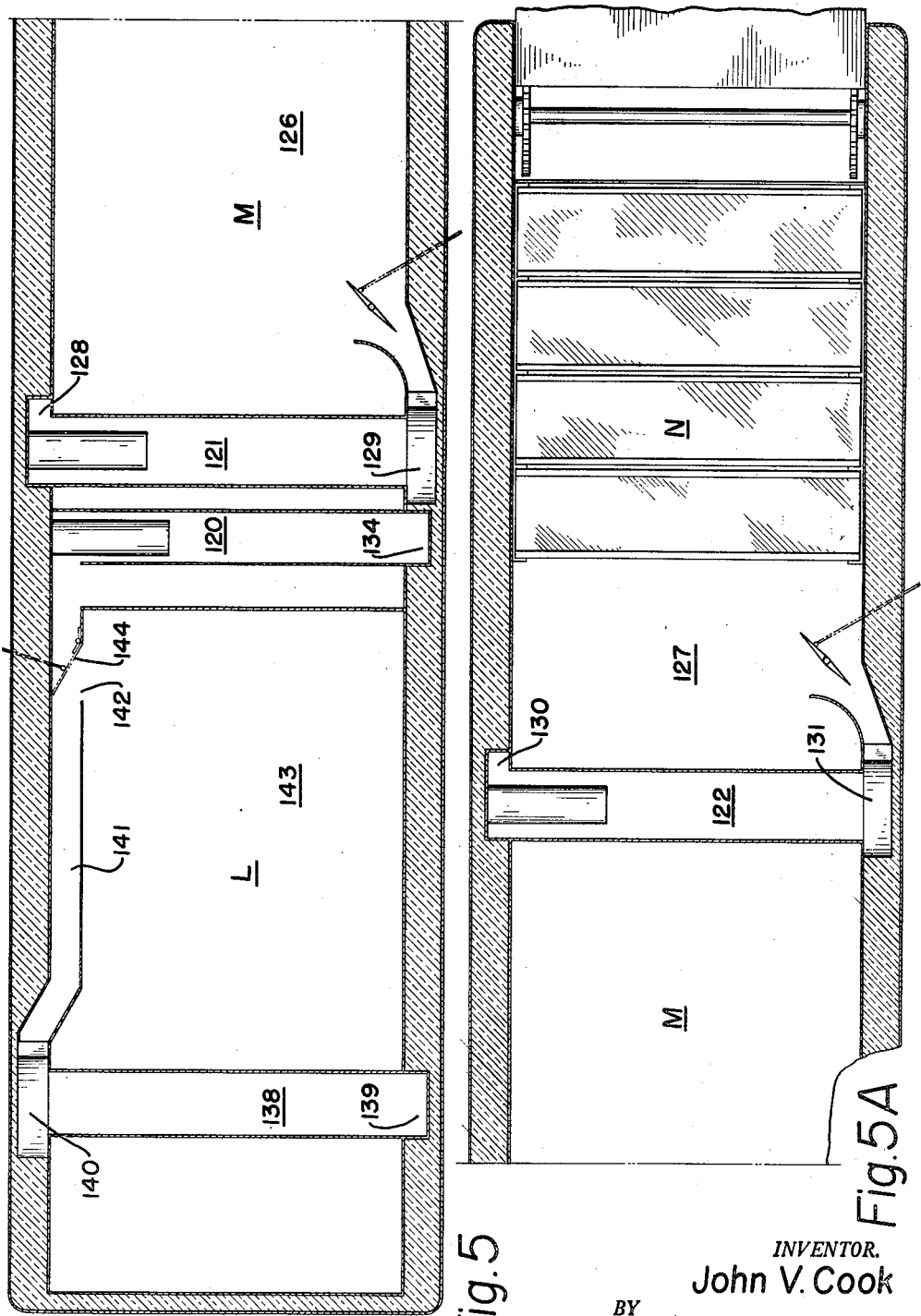

United States Patent Office 2,762,321
Patented Sept. 11, 1956

2,762,321

BAKING OVEN

John V. Cook, York, Pa., assignor to Read Standard Corporation, a corporation of Delaware Application October 14, 1952, Serial No. 314,685

3 Claims. (Cl. 107—63)

This invention relates to baking ovens of the commercial type, wherein a multiplicity of articles, such as loaves of bread, are simultaneously baked.

A primary object of the invention resides in the provision of a novel construction and arrangement of means for improving the baking characteristics of an oven.

More specifically, it is an object to provide a construction and arrangement of apparatus for effecting a continuous generally vertically upward movement of heat throughout substantially the length and breadth of an oven baking chamber, so that the flow of heat is directed and concentrated against the bottom and sides of the baking pans, with consequent lesser concentration or impingement of heat against the exposed tops of the loaves in the pans, whereby the sides and bottoms of the loaves, which are insulated to some extent by the wall thickness of the pans, and the tops of the loaves, which are directly exposed to the oven heat, are evenly and uniformly baked. In one form of the invention as applied to an indirect fired oven, such distribution is effected by withdrawing the oven atmosphere from the top of the baking chamber substantially throughout its length and breadth and reintroducing the withdrawn atmosphere into the bottom of the baking chamber substantially throughout its length and breadth.

A further object of the invention is to provide a baking oven having successive zones lengthwise thereof that may be independently controlled and to provide in such zones a novel construction and arrangement of means for effecting in each zone desired baking characteristics to permit of greater flexibility in operation of the oven. A related object is to provide in an oven of this type, a construction and arrangement of means as above set forth, whereby to effect in such zones desired accurately maintained temperatures and in each of which zones the heat is distributed throughout the length and breadth of such zone, to provide for even and uniform baking of bottoms and sides and top of the products being baked.

Other objects of the invention and features of novelty will be apparent from the following description taken in connection with the accompanying drawings, of which:

Figures 3 and 3A are longitudinal vertical sections through contiguous portions of a modified embodiment of the invention;

Figures 4 and 4A are longitudinal vertical sections through contiguous portions of another modified embodiment of the invention; and Figures 5 and 5A are sectional views taken on the line 5—5 of the respective contiguous portions shown in Figures 4 and 4A.

Figure 1:
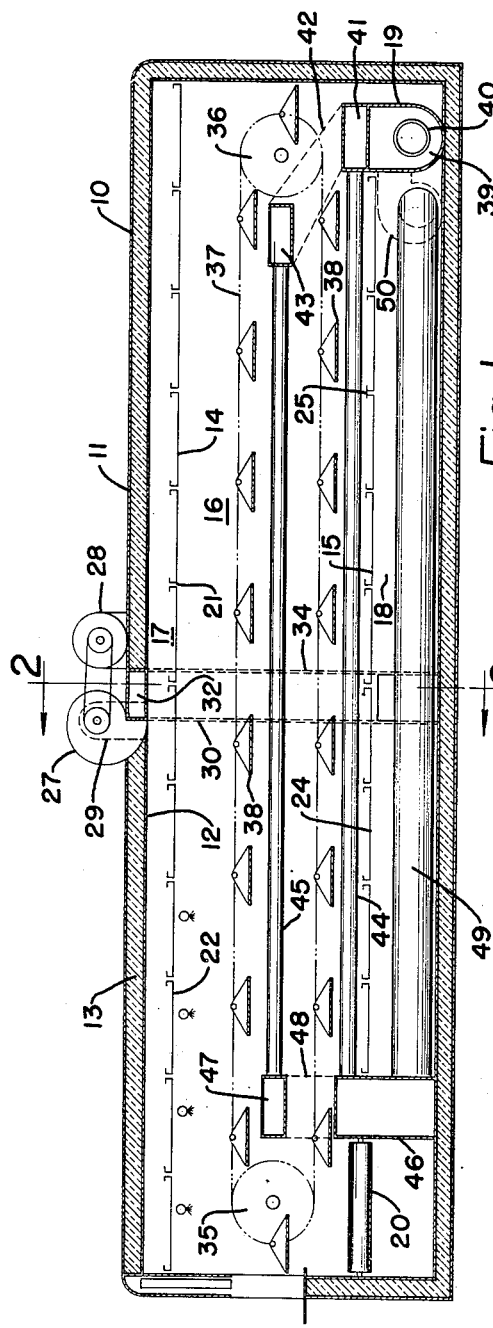
Figure 1 is a longitudinal vertical section through a baking oven embodying the present invention, parts being shown in elevation.
Figure 2:
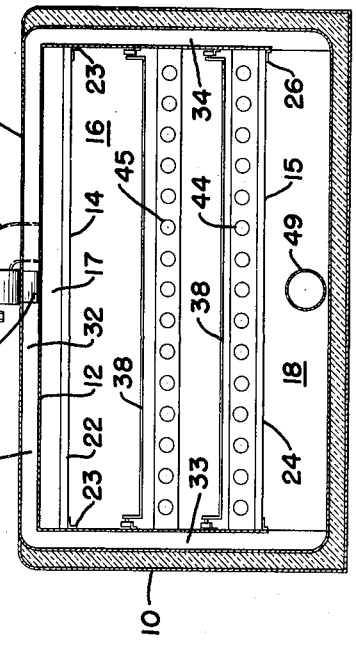
Figure 2 is a sectional view taken on the line 2—2 of Figure 1.

Referring to Figures 1 and 2, the baking oven 10 is of generally rectangular shape and includes an outer housing 11 preferably formed of sheet metal supported and reinforced in suitable and well known manner, and a generally similar inner housing 12. Interposed between the walls of the outer and inner housings of the oven is suitable heat insulating material 13.

The interior of the oven is provided with a substantially horizontal upper partition 14 and a substantially horizontal lower partition 15 forming an intermediate baking chamber 16, an upper evacuating chamber 17 for withdrawing baking chamber atmosphere from the baking chamber 16, and a lower plenum chamber 18 from which baking chamber atmosphere is re-introduced into the baking chamber 16, all as hereinafter more fully described.

The upper partition 14 extends substantially the width of the interior of the oven and preferably, as shown, extends substantially the length thereof. The partition 14 may terminate somewhat short of the ends of the oven without materially affecting the efficient functioning of the invention. In fact, in some oven constructions certain accesories or appurtenances may prevent the partition 14 from extending the full length of the oven. It is important, however, that the partition 14 extend as nearly as possible the width of the oven and the greater portion of the length thereof so that the chamber 17 covers a large area at the top of the oven.

The lower partition 15 extends substantially the width of the interior of the oven and the greater portion of the length thereof, terminating short of the rear wall of the oven to accommodate the heating unit 19 and terminating short of the front wall to accommodate the discharge unit 20 for the baked products.

The partition 14 is formed to provide a plurality of longitudinally, and preferably equidistantly spaced, transversely extending narrow elongated vents 21 through which, baking chamber atmosphere passes from the baking chamber 16 into evacuating chamber 17, as and for the purpose hereinafter described. Preferably, the partition 14 comprises a plurality of horizontal plates 22 extending transversely across substantially the width of the oven, and which plates 22 are supported in suitable manner, as by brackets 23 secured to the side walls of the inner housing 12. The plates 22 are spaced slightly apart to form therebetween the vents 21 which extend substantially the width of the oven.

The lower partition 15 is formed in the same manner as the upper partition 14, and as shown, includes a plurality of horizontal transversely extending plates 24 spaced slightly apart to form therebetween the vents 25, and supported by brackets 26 from the side walls of the inner housing 12. Through the vents 25 baking chamber atmosphere, which was withdrawn from the baking chamber 16 into the evacuating chamber 17, and then delivered, in a manner hereinafter described, to the plenum chamber 18, is reintroduced into the baking chamber 16.

The means for withdrawing and reintroducing the baking chamber atmosphere includes a suction-blower 27 driven by an electric motor 28, the suction-blower and motor being preferably mounted atop the oven. The intake side of suction-blower 27 is connected and communicates with the upper chamber 17 by an outlet duct 29 which extends through the top of the oven, preferably approximately mid-way between the sides and ends thereof. The discharge side of suction-blower 277 is connected and communicates with the lower chamber 18 by an inlet duct designated as a whole by the numeral 30 and which includes a duct portion 31 connecting the discharge side of the suction-blower 27 with a horizontal duct portion 32 extending transversely of the oven mid-way between its ends and disposed between the outer and inner top walls of the outer housing 11 and inner housing 12, respectively. The duct 30 also includes vertical duct portions 33 and 34 disposed between the outer and inner side walls of the outer housing 11 and inner housing 12, respectively, and which duct portions communicate at their upper ends with opposite ends of the horizontal duct portion 32 and open at their lower ends to the lower plenum chamber 18.

Mounted to extend longitudinally within the baking chamber 16 is a horizontally disposed endless conveyor of conventional form, illustrated somewhat diagrammatically in Figure 1. The conveyor includes a pair of transversely spaced apart sprocket wheels 35 at the forward end of the baking chamber 16, and a pair of similarly spaced sprocket wheels 36 at the rearward end thereof, over which sprocket wheels are trained suitable chains, indicated diagrammatically at 37. From the chains 37 are pivotally suspended the transversely extending trays 38 adapted to always assume an upright supporting position to receive the pans containing the products to be baked during their travel through the baking chamber.

The heating unit 19 includes a mixing chamber 39 extending transversely into the oven from one side thereof, and which chamber is disposed within the lower rearward portion of the oven. Mounted within and in spaced relation to the walls of the mixing chamber 39 is a tubular burner housing 40 with which is associated, in well known manner, a suitable burner, not shown, adapted to burn liquid fuel or gas, as desired.

The hot products of combustion enter a lower rear header 41 extending transversely across the width of the oven below the level of the lower run of trays 38 and above the level of the lower partition 15. Extending upwardly and forwardly from the opposite ends of the header 41, are ducts 42, preferably respectively disposed between the inner and outer walls of the opposite sides of the oven. The upper ends of the ducts 42 communicate with the opposite ends of an upper rear header 43 which extends transversely across the width of the oven and is disposed between the upper and lower runs of the trays 38, immediately forward of the sprocket wheels 36.

Within the baking chamber 16, communicating with and extending horizontally forward of the headers 41 and 43 are lower and upper banks 44 and 45 of transversely spaced apart flues. The bank of flues 44 is disposed between the lower run of the trays 38 and the partition 15, while the bank of flues 45 is disposed between the upper and lower runs of the trays 38. At their forward ends the banks of flues 44 and 45 communicate respectively with lower front header 46 and upper front header 47. The headers 46 and 47 extend transversely the width of the oven and are connected to ducts 48, disposed between the inner and outer walls of the opposite sides of the oven.

A return flue 49 communicates with the lower portion of header 46 and extends rearwardly therefrom centrally through the plenum chamber 18 to the suction side of a suction blower 50. The discharge side of the blower 50 is connected with the heater mixing chamber 39, whereby the hot products of combustion are recirculated. While not shown, it is understood that a damper regulated stack is disposed between the blower 50 and the mixing chamber 39, in conventional manner, to vent a desired proportion of the combustion gases after having passed through the heating system.

The indirect heating system described provides the heat in the baking chamber for the products to be baked. The hot baking chamber atmosphere is withdrawn through the slots or vents 21 of the partition 14 into the upper evacuating chamber 17 by the suction blower 27. From the chamber 17 the hot baking chamber atmosphere is withdrawn through the outlet duct 29 and then discharged by the blower 27 through the inlet duct means 30 into the plenum chamber 18. From the plenum chamber the hot baking chamber atmosphere is reintroduced into the baking chamber 16 through the slots or vents 25 of the partition 15. There is, therefore, a continuous upward movement or circulation of hot baking chamber atmosphere extending throughout the width of the oven and substantially the length thereof, whereby an even and uniform distribution of heat is provided throughout the baking chamber.

Referring to Figures 3 and 3A, the invention is shown as applied to a zone type oven. The oven 55 comprises three successively disposed zones A, B and C. As in the first described form of the invention, the oven 55 is provided with a horizontal upper partition 56 extending substantially the width and length of the oven. The partition 56 together with the transverse upright partition plates 57 and 58, form in the upper portion of the oven, individual upper or evacuating chambers 59, 60 and 61 for the respective zones A, B and C.

Each of the zones A, B and C is provided with an individual indirect heating system which in all essential respects is the same as in the first form of the invention, and is therefore not described in detail. Adjacent the lower rearward ends of the zones A, B and C are respective transversely extending heating units 62, 63 and 64. At the lower forward ends of the zones A, B and C, are the transversely extending headers 65, 66 and 67, respectively, similar to the header 46 of the previously described form of the invention. The header 65 of zone A is set back a distance sufficient to accommodate the discharge unit 68 for the baked products.

Between the header 65 and heating unit 62 of zone A, the header 66 and heating unit 63 of zone B, and the header 67 and heating unit 64 of zone C, are respective horizontal partitions 69, 70 and 71 extending substantially the width of the oven and forming in the lower portion thereof, the individual plenum chambers 72, 73 and 74.

Between the upper evacuating chambers 59, 60, 61 and the lower plenum chambers 72, 73, 74, is the baking chamber 75 which extends the full length of the oven. The upper partition 56 is provided with the transversely extending slots or vents 76 in all respects the same as the vents 21 of the first form of the invention, and through which vents baking chamber atmosphere is withdrawn from the baking chamber 75 into the evacuating chambers 59, 60 and 61. The lower partitions 69, 70 and 71 are provided, respectively, with the transversely extending slots or vents 77, 78 and 79, in all respects the same as the vents 25 of the first described form of the invention, and through which vents baking chamber atmosphere, which was withdrawn from the baking chamber 75 into the evacuating chambers 59, 60 and 61, is reintroduced into the baking chamber 75.

The zones A, B and C, are provided, respectively, with suction-blower 80, outlet duct 81 and inlet duct means 82; suction-blower 83, outlet duct 84 and inlet duct means 85; and suction-blower 86, outlet duct 87 and inlet duct means 88; for delivering the baking chamber atmosphere from the upper evacuating to the lower plenum chambers. The suction-blower and duct means for each of the zones A, B and C, is in all respects the same as the suction-blower and duct means of the first form of the invention.

Mounted longitudinally within the baking chamber and extending through the zones A, B and C is a horizontally disposed endless conveyor 89 for transporting the products to be baked through the oven.

The oven is flexible in operation and can be controlled to provide optimum conditions to produce the desired bake for a variety of dough products. The indirect heating means for the zones A, B and C are independently controlled whereby any desired heat, best suited to the product being baked, may be provided in the different zones. The baking chamber atmosphere recirculating system for each of the zones A, B and C is independently controlled, so that recirculation of baking chamber atmosphere can be shut off or turned on in one or more of the zones independently of the other zone or zones. If, for example, it is desired to introduce steam into the front portion of the oven, for which steam supply conduits 90 are provided, in order to produce desired characteristics in the crust or exposed portions of the loaves of bread, then the baking chamber atmosphere recirculating system in zone A may be shut off, while that of zones B and C may be continued in operation.

In Figures 4, 4A and 5, 5A is illustrated a zone type oven having zones L, M and N, provided respectively, with heating units 120, 121 and 122, and through all of which zones extends the baking chamber 123. Zones M and N are provided with the upper evacuating chambers 124 and 125 similar to the upper chamber 17 of Figures 1 and 2, and lower plenum chambers 126 and 127 similar to the plenum chamber 18 of Figures 1 and 2. In order to vent a portion of the gases to atmosphere, a suction blower 113 operated by a motor 114 is provided, the intake side of the blower 113 communicating with chamber 124 through adapter pipe 115 provided with a damper 116, while the discharge side of blower 113 communicates with stack 117.

Zone M is provided with a suction-blower 129, driven by suitable means, not shown, arranged with its intake side in communication, through the vertically extending duct 128, with the upper chamber 124, and with its discharge side in communication, through the heating unit 121, with the lower chamber 126.

Similarly, zone N is provided with a suction-blower 131, driven by suitable means, not shown, arranged with its intake side in communication, through the vertically extending duct 130, with the upper chamber 125, and with its discharge side in communication, through the heating unit 122, with the lower chamber 127.

In Figures 4, 4A and 5, 5A, the heating units, ducts and suction-blowers are shown at the forward ends of zones M and N, however, the location is a matter of choice usually dictated by the most convenient arrangement to accommodate the conveying, dumping or other parts of the oven.

In a tunnel oven, as illustrated in Figures 4, 4A and 5, 5A, the front zone L is preferably provided with a combined indirect and direct blowing type heating arrangement. In zone L, the products of combustion from the burner unit 120 are delivered to upper and lower rear headers 132 and 133, connected by duct means 134. From headers 132 and 133, the combustion gases pass through upper and lower banks of flues 135 and 136, respectively, to upper and lower front headers 137 and 138, connected by duct means 139. A suction-blower 140 has its intake side connected with the lower portion of header 138, and its discharge side connected with a return flue 141 communicating with the heating unit 120 for returning combustion gases thereto.

The return flue 141 is provided with an opening 142 communicating with a plenum chamber 143 whereby combustion gases may be delivered thereto. A damper 144 controls the opening 142 and may be adjusted to admit all or any portion of the combustion gases into the plenum chamber 143 or to the heating unit 120. Combustion gases discharged into the plenum chamber 143 are forced upwardly into the baking chamber 123 through the vents or slots 145 in the portion 146 for direct heating of the products to be baked.

Should it be desired to introduce steam into the zone L through steam inlets 147, the damper 144 is preferably adjusted to close the opening 142, thereby shutting off the direct blowing heat in that zone while permitting indirect heating thereof.

I claim:

1. In a baking oven, substantially horizontal upper and lower partitions in said oven extending at least the greater portion of the length and width thereof to form an uppermost chamber, a lowermost chamber and an intermediate baking chamber wholly therebetween, means for indirectly heating the baking chamber atmosphere, including a plurality of flues extending longitudinally through the greater portion of the length of said intermediate baking chamber, said upper partition being provided with a plurality of vents extending therethrough and distributed over the entire area thereof, and said lower partition being provided with a plurality of vents extending vertically therethrough and over the entire area thereof, duct means connecting said uppermost and lowermost chambers and a suction-blower in said duct means for withdrawing baking chamber atmosphere heated by said flues from said baking chamber through the vents in said upper partition into said uppermost chamber and forcibly injecting said withdrawn baking chamber atmosphere from said lowermost chamber into said baking chamber through the vents in said lower partition, whereby to maintain a substantially vertical upward flow of heated baking chamber atmosphere throughout at least the major portion of said baking chamber in a direct path from the vents in said lower partition to the vents in said upper partition.

2. In a baking oven, substantially horizontal upper and lower partitions extending substantially the width of and at least the greater portion of the length of the interior of the oven, said partitions forming in said oven an uppermost chamber, a lowermost chamber and an intermediate baking chamber wholly therebetween, means for indirectly heating the baking chamber atmosphere, including a plurality of flues extending longitudinally through the greater portion of the length of said intermediate baking chamber, said horizontal partitions being provided throughout substantially their length with a plurality of longitudinally spaced transverse vents extending vertically therethrough and extending substantially the width thereof, providing communication between said baking chamber and said uppermost and lowermost chambers, duct means connecting said uppermost and lowermost chambers and a suction-blower in said duct means for withdrawing baking chamber atmosphere heated by said flues from said baking chamber through the vents in said upper partition into said uppermost chamber and forcibly injecting said withdrawn baking chamber atmosphere from said lowermost chamber into said baking chamber through the vents in said lower partition, whereby to maintain a substantially vertical upward flow of heated baking chamber atmosphere throughout the greater portion of the length of said baking chamber in a direct path from the vents in said lower partition to the vents in said upper partition and throughout substantially the width thereof.

3. In a baking oven, a plurality of independent longitudinally spaced heating means to form in said oven a plurality of successive heating zones, means associated with the heating means of one of said zones for selective direct and indirect heating thereof, substantially horizontal upper and lower partitions in another of said zones to form therein an uppermost chamber, a lowermost chamber and an intermediate baking chamber wholly therebetween, said partition being provided with a plurality of vents distributed over substantially the entire area thereof, duct means connecting said uppermost and lowermost chamber, means for supplying hot combustion gases to said duct means from the heating means in said last named zone, and a suction-blower in said duct means for forcibly injecting hot combustion gases into said lowermost chamber and thence into said baking chamber through the vents in said lower partition and for withdrawing gases from said baking chamber through the vents in said upper partition into said uppermost chamber and returning withdrawn gases to said lowermost chamber, whereby to maintain an upward flow of gases throughout the said last named zone.

References Cited in the file of this patent

UNITED STATES PATENTS

| | | |
|---|---|---|
| 1,564,566 | Harris | Dec. 8, 1925 |
| 2,143,525 | Salerno | Jan. 10, 1939 |
| 2,149,537 | Morton | Mar. 7, 1939 |
| 2,236,085 | Cook | Mar. 25, 1941 |
| 2,286,049 | Baker | June 9, 1942 |
| 2,575,291 | Owen | Nov. 13, 1951 |